UNITED STATES PATENT OFFICE.

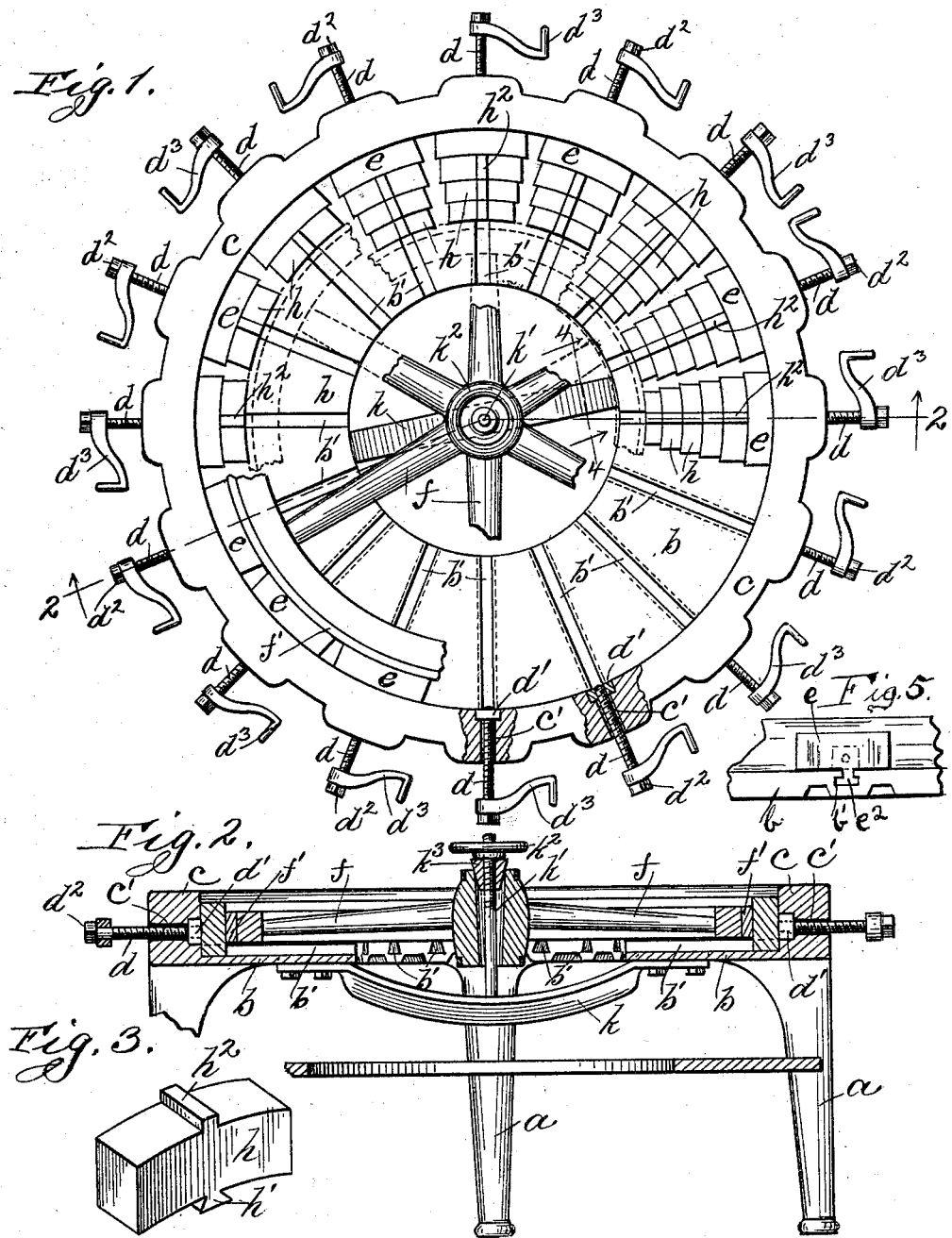

HENRY T. HENDERSON, OF KEOKUK, IOWA, ASSIGNOR OF ONE-HALF TO RALPH B. LOURIE, OF KEOKUK, IOWA.

TIRE-SETTING MACHINE.

SPECIFICATION forming part of Letters Patent No. 695,208, dated March 11, 1902.

Application filed January 15, 1900. Serial No. 1,574. (No model.)

*To all whom it may concern:*

Be it known that I, HENRY T. HENDERSON, a citizen of the United States, residing at Keokuk, in the county of Lee and State of Iowa, have invented a certain new and useful Improvement in Tire-Setting Machines, of which the following is a full, clear, concise, and exact description, reference being had to the accompanying drawings, forming a part of this specification.

My invention relates to a tire-setting machine, my object being to provide a machine which can be readily operated and manipulated by hand and which will serve to effectively set or reset the tires of carriage or other wheels while the said tires are cold.

There are a number of machines for setting tires while cold now on the market; but these machines are most commonly operated by power, and great difficulties have heretofore been encountered in the production of a machine of this class which can be readily operated by hand. In accordance with the present invention I have been able to provide a machine of this class which is capable of operation by hand and which acts to effectively set the tires, and I have hereinafter described the features of construction by which I am enabled to accomplish this result.

In accordance with my invention I provide a bed plate or frame, usually of annular form, which carries on the upper face a plurality of channels or guides extending radially, the bed-plate being surrounded by an upwardly-extending annular rim, through which pass a plurality of screws, one screw being situated opposite each of the radial channels. Instead of providing a tapped hole through the rim for the screws I preferably provide a recess in the rim at the inner end of the hole, adapted to receive a nut or other part containing a tapped hole with which the screw engages. Opposite the inner end of each of the screws and in position to be engaged thereby is a follower-block carrying a tenon or lug adapted to engage the corresponding channel or guide, whereby by turning the several screws the follower-blocks may be advanced to engage the tire, which is adapted to rest against the inner faces of the follower-blocks. In order to accommodate wheels of different sizes, I provide, in addition to the follower-blocks, a plurality of distance pieces or blocks adapted to be interposed between the follower-blocks and the tire of the wheel. The follower-blocks and the distance-blocks constitute a system of radially-traveling compression-blocks. I preferably construct the channels with a less transverse dimension at the top than at the bottom and form the tenons on the blocks to correspond, so that the blocks cannot be removed from the channels transversely. This necessitates the placing of the blocks in position by passing the tenons into the channels at the ends of the channels, and as it is frequently desired to use the machine with haste I have in practice provided upon the distance pieces or blocks, in addition to the tenon adapted to fit the channel, an additional tenon on the opposite side of the block having perpendicular side faces, whereby the same may be inserted into the channel or removed therefrom in a transverse direction. In order that the blocks may not buckle under pressure and the tenons with perpendicular walls be thus thrust out of the channels, some of the blocks at intervals may be placed in position with the tenons having oblique walls in engagement with the channels. The tenons on the two sides of the blocks may thus be used interchangeably in the series of blocks moved by each screw, and thus coact in producing a device which may be readily adapted to the conditions of use. I provide a standard adapted to pass through the interior of the hub of the wheel to be acted upon, the standard carrying at the upper end a hand-wheel and part adapted to engage the hub to limit the upper movement of the hub during the compression, whereby the wheel may be prevented from assuming too much "dish" during the operation.

I have illustrated my invention in the accompanying drawings, in which—

Figure 1 is a plan view of the machine of my invention. Fig. 2 is a sectional view on line 2 2, Fig. 1. Fig. 3 is a detached view of one of the distance-blocks. Fig. 4 is a detailed view looking at the ends of the guiding-channels along line 4 4, Fig. 1. Fig. 5 is a view showing a modified form of tenon for the blocks.

Like letters refer to like parts in the several figures.

Supported upon the legs $a\ a$ is the bed-plate $b$ of annular form, carrying in the upper face the channels $b'\ b'$, which extend radially. The bed-plate is bounded by an upwardly-extending rim or flange $c$, through which openings $c'\ c'$ pass, the inner ends of the openings being enlarged to form recesses, which receive the nuts $d'\ d'$, having tapped holes, with which the screws $d\ d$ are adapted to engage. The screws are shown as provided upon the ends with heads $d^2\ d^2$, adapted to be engaged by a wrench, whereby the screws may be turned, and for convenience I have shown each of the screws provided with a crank-arm $d^3$, which may be grasped by the hand to turn the screw. Within the rim $c$ are the follower-blocks $e\ e$, one being situated opposite the end of each of the screws $d\ d$. As shown more clearly in Fig. 4, the channels $b'$ are of greater transverse dimension at the bottom, and the tenon $e'$ on the follower-block $e$ is of a shape to conform to the cross-section of the channel, so that the follower-block cannot be removed from the channel transversely. Accordingly when pressure is applied to the follower-block by means of the screw $d$ the tendency of the follower-block to lift out of the channel is prevented by the engagement of the tenon with the walls of the channel. For the largest size of wheel which the machine will accommodate the inner faces of the follower-blocks $e\ e$ are adapted to engage the tire $f'$ of the wheel $f$ being operated upon, and by turning the several screws $d$ the follower-blocks are caused to advance and compress the tire, thereby setting the same. To adapt the machine to wheels of smaller size, distance-blocks $h\ h$ are provided, adapted to be interposed between the several follower-blocks and the tire of the wheel. These distance-blocks are likewise provided with tenons $h'$ of a form to fit the channels, whereby the transverse removal of the tenons from the slots is prevented. To accommodate the speedy preparation of the machine for the setting of a tire, however, I have provided, in addition to the tenons $h'$, tenons $h^2$ upon the opposite faces of the distance-blocks $h$, these tenons being of a width corresponding to the transverse dimension of the channels at the upper edges, whereby the tenons $h^2$ may be inserted into the channels or removed therefrom transversely. As illustrated in dotted lines in Fig. 1, one or more of these distance-blocks may be interposed between each follower-block and the tire to accommodate the machine to the particular size of wheel to be operated upon.

Extending across the central opening of the annular bed-plate and bowed downward sufficiently to accommodate the hub of the wheel is a transverse support $k$, upon which is mounted a standard $k'$, which is illustrated as a rod threaded at the upper end. A hand-wheel $k^2$ is adapted to engage the threaded end of the standard, and a conical washer or part $k^3$ is placed beneath the main wheel and adapted to engage the opening or bore of the hub, whereby the wheel may be centered in the machine and whereby the upward movement of the hub is limited to prevent the wheel from assuming too much dish during the compression necessary to set the tire.

In operating the machine the wheel is placed in position with the hub surrounding the standard $k'$, and the wheel $k^2$ is then placed in position and screwed down until the hub assumes the proper position, and then the distance-blocks are placed in position if required to accommodate the machine to the particular size of wheel, and then the screws are turned, usually by grasping the crank-arms with the hand, until the screws have been turned as far as the same can be conveniently turned by hand, after which by means of a wrench engaging the heads the screws may be further turned to subject the tire to the required pressure to compress and set the same to the wheel. After the tire has been thus set the screws are withdrawn, the hand-wheel $k^2$ is removed, and the wheel taken from the machine.

In Fig. 5 I have shown a modification of the tenon $e^2$, attached to the distance-block $e$. The slot $b'$ in the bed-plate $b$ in this case conforms to the shape of the tenon $e^2$. The object of this modification is to permit less play among the parts of the machine, and thus obtain greater accuracy.

Having described my invention, what I claim as new, and desire to secure by Letters Patent, is—

1. In a tire-setting machine, the combination with a bed comprising an annular plate surrounded by a raised rim and having radial channels formed in the upper surface thereof and of a depth less than the thickness of the plate, screws passing through said rim, means whereby said screws may be rotated, follower-blocks having tenons engaging said channels and adapted to be operated by said screws, distance-blocks adapted to fit between said follower-blocks and the tire of the wheel and having tenons also engaging said channels, a hub-depressing device arranged centrally relatively to said annular plate for imparting the desired dish to the wheel during compression, and means to support said device, substantially as described.

2. In a tire-setting machine, the combination with a bed comprising an annular plate surrounded by a raised rim, $c$, and having radial channels, $b'$, $b'$, formed in the upper surface thereof, of a depth less than the thickness of the plate, screws passing through said rim opposite said respective channels, parts carrying tapped holes engaged by said screws and adapted to rest against the inner face of said raised rim, follower-blocks, $e$, $e$, engaged and moved by said screws and having tenons to engage said channels, $b', b'$, distance-blocks, $h, h$, adapted to rest between said follower-blocks and the wheel-tire and having tenons engaging said channels, $b', b'$, a diametral support bridging the central opening of said plate, and a hub-depressing device carried thereon for imparting the desired dish to the wheel during compression, substantially as described.

3. A compression-block for tire-setting machines having two of its opposite faces concentric and carrying upon one of the remaining faces a tenon with divergent sides and upon the face opposite thereto a tenon with non-divergent sides, substantially as described.

In witness whereof I have hereunto subscribed my name in the presence of two witnesses.

HENRY T. HENDERSON.

Witnesses:
JNO. C. WELLEHAN,
MOLLIE C. RUTLEDGE.